May 14, 1935.  B. G. OLVING  2,001,432
CIRCUIT CONTROLLING AND INDICATING DEVICE
Filed March 11, 1933  2 Sheets-Sheet 1
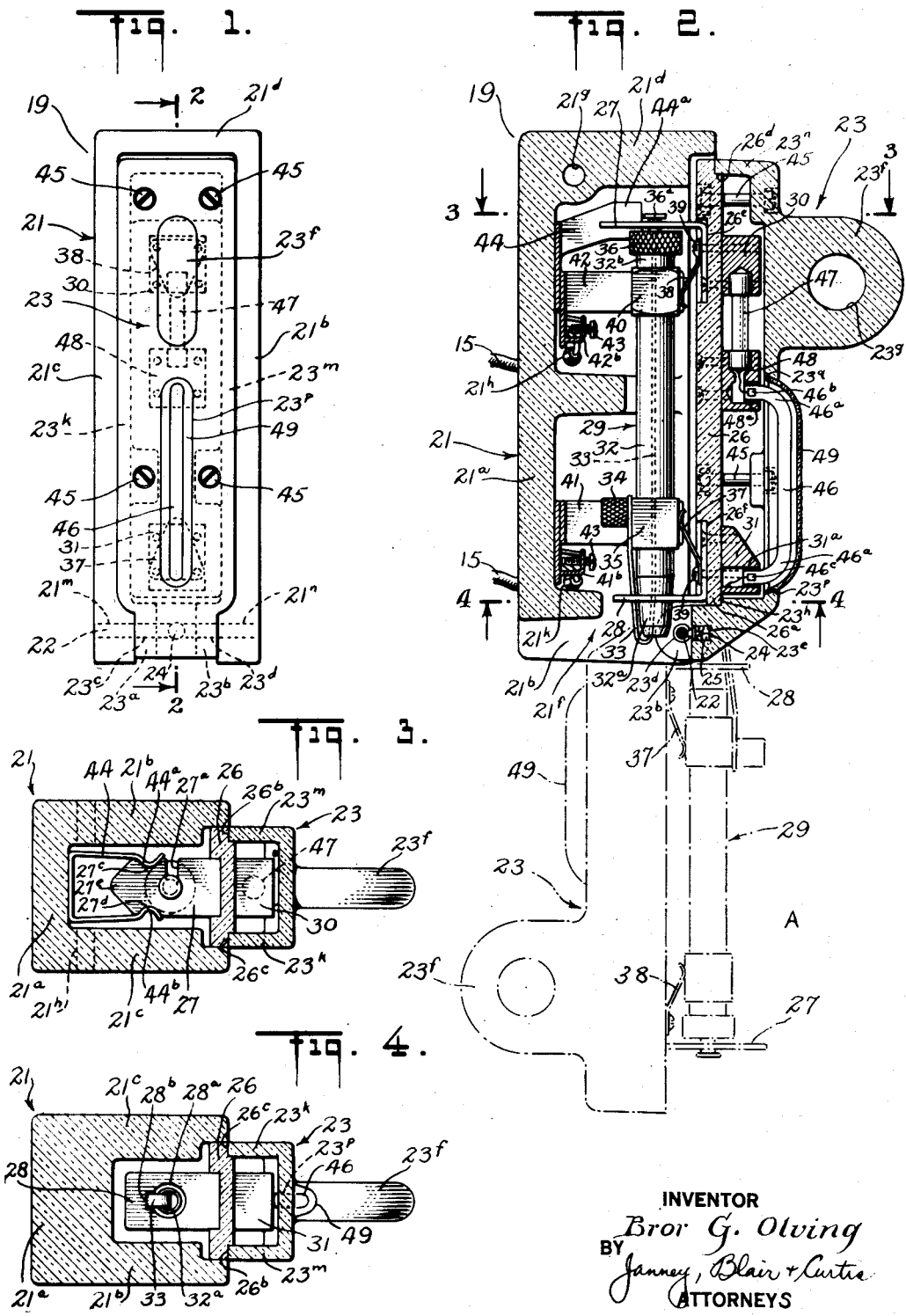
INVENTOR
Bror G. Olving
BY Janney, Blair & Curtis
ATTORNEYS May 14, 1935.  B. G. OLVING  2,001,432
CIRCUIT CONTROLLING AND INDICATING DEVICE
Filed March 11, 1933  2 Sheets-Sheet 2
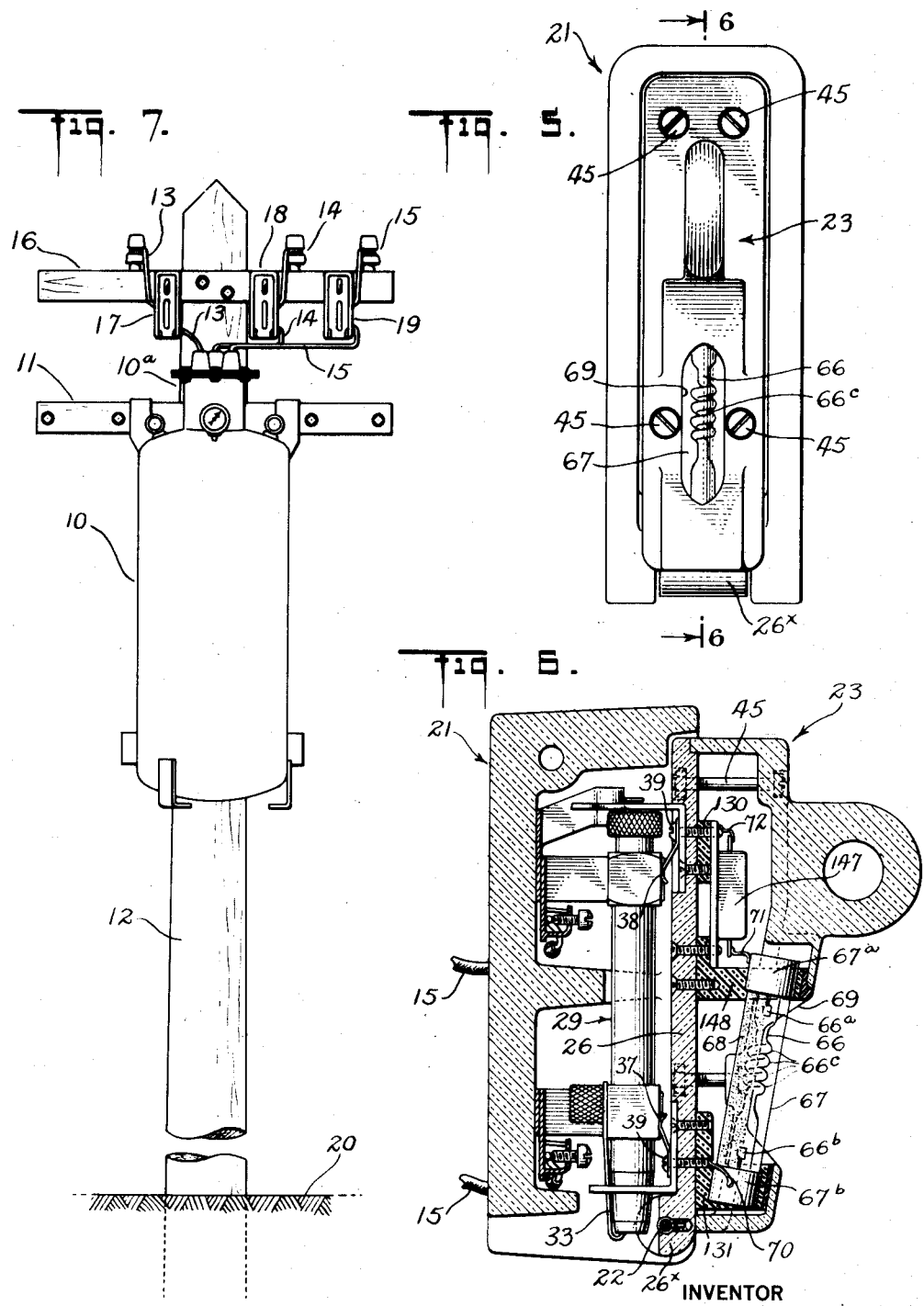
INVENTOR
Bror G. Olving
BY Janney, Blair + Curtis
ATTORNEYS Patented May 14, 1935

2,001,432

UNITED STATES PATENT OFFICE 2,001,432

CIRCUIT CONTROLLING AND INDICATING DEVICE

Bror G. Olving, Hamden, Conn., assignor to Products Protection Corporation, a corporation of Delaware Application March 11, 1933, Serial No. 660,379

21 Claims. (Cl. 200—121)

This invention relates to circuit-interrupting devices for controlling or protecting electrical apparatus.

One of the objects of this invention is to provide a device for protecting electrical apparatus which is simple, compact, and economical in construction, and which at the same time gives an immediate and reliable indication of the actuation and condition of the protecting device. Another object is to provide a device of the above-mentioned character which is efficient and thoroughly reliable in action, and which gives a visual indication of the actuation of the device that can be seen, particularly where it is embodied in an outdoor installation, throughout a wide angle. Another object is to provide a device of the above-mentioned character in which the circuit-interrupting device includes an element which may be replaced or changed without requiring change or adjustment of the other parts of the device. Another object is to provide a circuit-interrupting and indicating device which is quick and thoroughly reliable in operation, and which automatically signals to indicate the condition of the interrupting device and does so in a thoroughly dependable manner and without sacrifice of the protecting features. Another object is to provide a device of the above-mentioned character which is rugged, compact and strong in construction, dependable in operation, and well adapted to meet the many varying conditions of actual practical use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings, in which are shown several of the various possible embodiments of this invention, Figure 1 is a front elevation of one form of device for interrupting a circuit and indicating its condition;

Figure 2 is a vertical sectional view of the device as seen along the line 2—2 of Figure 1;

Figure 3 is a horizontal sectional view as seen along the line 3—3 of Figure 2;

Figure 4 is a horizontal sectional view as seen along the line 4—4 of Figure 2;

Figure 5 is a front elevation of a modified form of device;

Figure 6 is a central vertical sectional view of the modified construction as seen along the line 6—6 of Figure 5, and Figure 7 is a front elevation of an outdoor installation of electrical apparatus illustrating also the installation of the circuit-interrupting and indicating device, all on a smaller scale.

Similar reference characters refer to similar parts throughout the several views in the drawings.

As conducive to a clearer understanding of certain features of my invention, it may at this point be noted that in the installation of electrical apparatus, and particularly in the installation of power apparatus, such as capacitors, reactors, or transformers, it is desirable to connect such pieces of apparatus to the power line through a circuit-interrupting device such as a fuse or circuit breaker. Often the satisfactory operation of the piece of apparatus can only be told by inspection of the circuit-interrupting device. Such electrical apparatuses are frequently installed in places that are inaccessible or they are frequently operated at a high voltage making a close approach for inspection purposes impracticable if not impossible. One of the dominant aims of this invention is to provide a simple and inexpensive device for controlling the circuit of such apparatus to protect it automatically while avoiding the necessity of endangering life and limb in its inspection, in the provision of a dependable and safe indicator of the condition of the device.

Referring now to the drawings and more particularly to Figure 7, there is shown an electrical apparatus at 10, illustratively a capacitor, suitably enclosed and mounted on a cross-arm 11 of a lower line pole or tower 12. Suitable terminal insulators 10ª lead the line conductors through the casing to the apparatus within. Illustratively the apparatus 10 is three-phase and hence the three conductors 13, 14, 15, insulatedly supported by an upper cross-arm 16, are led into the capacitor casing.

Interposed in the circuits of the power line conductors 13—14—15 are the circuit-interrupting and indicating devices 17, 18 and 19, respectively, all as shown in Figure 7. These devices are preferably secured to the cross-arm 16 by any suitable means, such as brackets (not shown). The mounting is such that the devices preferably face in the same direction and are exposed to view from the ground 20.

Referring now more particularly to Figures 1 and 2, one of the above-mentioned three circuit-interrupting and indicating devices is shown on an enlarged scale and it may be considered to be the device 19 of Figure 7 and its associated circuit conductor 15. The device 19, to which the others are similar, includes a housing 21 preferably rectangular and box-like in form with a bottom portion 21$^a$, side wall portions 21$^b$ and 21$^c$ (see also Figures 4 and 5), and a closing upper end portion 21$^d$. The housing is preferably constructed of a suitable weather-proof and fireproof material, such as porcelain.

Suitable openings or holes, one of which is shown at 21$^g$, are provided, through which, illustratively, a bolt may be passed to secure the housing to a suitable bracket (not shown) which in turn may be secured to the cross-arm 16 (Figure 7).

The side wall 21$^b$ is provided with suitable vertically spaced holes shown at 21$^h$ and 21$^k$ (see Figure 2) for the line conductors 15. Similar holes are provided in wall 21$^c$ but being not used, are preferably filled with a suitable sealing compound to give an unbroken wall to protect the enclosed parts from dirt, dust, water, and the like. Side walls 21$^b$ and 21$^c$ are provided at their lower end portions with suitable holes 21$^m$ and 21$^n$ (Figure 1) to receive a hinge pin 22 (Figures 1 and 2) for supporting and hingedly mounting a lid or cover 23 that closes the box-like casing 21.

The cover 23, somewhat irregularly shaped, is also preferably fashioned of a weather-proof and fireproof material, such as porcelain. The inside face of the lower end of the cover, as seen in Figures 1 and 2, has a pair of inwardly extending ears 23$^a$ and 23$^b$ provided with suitable alined holes indicated at 23$^c$ and 23$^d$, respectively. The ears 23$^a$ and 23$^b$ are of such spacing that they are loosely received between the lower thickened portions of the housing side walls 21$^b$ and 21$^c$; the holes in these parts are alined and hinge connection is effected by a hinge pin 22 passed through the holes 23$^c$ and 23$^d$ of the ears 23$^a$ and 23$^b$ of the cover 23, and the holes 21$^m$ and 21$^n$ of the housing 21.

Undesired displacement of the hinge pin 22 is prevented by a cone-tipped plunger 24 (Figure 2) which frictionally engages a mid-portion of the hinge pin 22 and is urged and held in frictional engagement by a spring 25 housed within the hole 23$^e$ in the cover 23, the plunger 24 being guided by the walls of the hole 23$^e$.

As previously noted, housing 21 is supported substantially in a vertical position, and thus the cover 23 may be swung in an arc about the horizontal axis of pin 22 to open or close the housing.

The box-like cover 23 is provided at its upper outer portion (Figure 2) with an eyelet 23$^f$ of substantial size, the eyelet thus forming means for conveniently and safely opening or closing the housing as by inserting an insulated hook in the hole 23$^g$ and then moving the cover into an open or closed position.

The cover 23 is box-like in shape, having peripheral or side walls (see, for example, walls 23$^k$ and 23$^m$ of Figure 3) and at its lower portion or lower end wall 23$^h$ rabbeted to receive the lower end 26$^a$ of a baffle board or panel 26 which, like the cover 23, is preferably rectangular in form. The edge portions of the panel are rabbeted as at 26$^b$, 26$^c$ (see Figures 3 and 4), and 26$^d$ (see Figure 2). The rabbeted edges of the panel 26 snugly receive the side wall portions 23$^k$ and 23$^m$ (see Figures 3 and 4) of the cover 23 as well as its upper end wall 23$^n$ (see Figure 2). Panel 26 and closure 23 thus enclose a chamber or space, for a purpose set forth hereinafter. Firm engagement between panel 26 and the cover 23 is maintained by suitable bolts 45 having their bolt head and nut portions received within suitable recesses provided in cover and panel respectively.

To effect a reasonably tight closure between housing 21 and cover 23 with its associated panel 26, the upper end wall 21$^d$ and the side walls 21$^b$ and 21$^c$ are preferably rabbeted (as appears from Figures 2, 3 and 4) and in the rabbeted parts are received the corresponding end and side edges of panel 26, which forms the inner face of cover 23. The depths of the various rabbets provided in the wall portions of the housing 21 are sufficient to prevent a direct contact between the bases of the rabbets and the exposed face (left-hand face in Figure 2) of the panel 26, the purpose of which will appear more fully hereinafter. The depth, however, is sufficient to provide a reasonably loose fit between housing and cover providing therebetween a tortuous path to prevent the entrance of foreign matter, yet, nevertheless, to allow a light circulation of air from the lower wide open end portion 21$^f$ up through the main body portion of the housing and out at the top, to clear the housing of smoke and gases as will be pointed out later herein.

To insure a complete weather-proof and fireproof construction, the baffle board or panel 26 is also preferably made of porcelain. The under surface of the baffle board, or that portion as seen from the left of Figures 2, 3 and 4, is recessed as at 26$^e$ and 26$^f$ and adapted to receive the metallic L-shaped brackets 27 and 28 (Figure 2), respectively, which serve to support a circuit-interrupting device 29 preferably in the form of an expulsion fuse.

The brackets 27 and 28 are preferably fastened by suitable screws passing through suitable holes provided in the panel 26 to metallic supports 30 and 31, respectively, (see Figure 2) contained within the chamber of the cover 23 and the further purpose of which will appear more fully hereinafter.

The lower bracket 28 is preferably provided with a round hole as at 28$^a$ (Figure 4) having a cut-away edge portion as at 28$^b$; hole 28$^a$ receives the lower end 32$^a$ of a fiber tube 32 and recess 28$^b$ receives the fuse link 33 that projects out of the lower end of the tube and is bent up as in Figure 2. The fuse link 33 is secured by a thumb screw 34 to a suitable ring or collar contact element 35 mounted exteriorly of the fiber tube 32.

The upper L-shaped bracket 27 is provided with an open-ended slot 27$^a$ (see Figure 3) preferably of such width as to loosely receive the neck portion 36$^a$ (Figure 2) of the metallic fuse cap 36, the latter threadedly or otherwise engaging the upper end portion 32$^b$ of fiber tube 32. Thus, the tube-like fuse member is supported by the inner face of cover 23—26. Spring contact members 37 and 38 are mounted on the left-hand face of the panel 26 (Figure 2) and conveniently are fastened thereto by the same screws 39 which fasten brackets 27 and 28 to the panel 26, the screws being threaded into blocks 30—31. The free ends of the spring members 37 and 38 are shaped to provide end portions which, when the lid 23 is closed, are pressed into engagement with the respective contact members 35 and 40 associated with fuse 29, parts 35 and 40 being sleeve-like in shape and extending about the fiber tube 32.

The contact members 35 and 40 associated with the insulating tube 32 of the fuse 29 in turn contact with and between the yielding fingers of spring clip members 41 and 42, respectively. The clip members are fastened to the bottom (lefthand wall as seen in Figure 2) of the housing 21 by any suitable means (not shown) such as bolts or rivets. The clip members 41 and 42 are preferably provided with raised ear portions 41b and 42b, respectively, which are suitably threaded and adapted to receive binding screws 43 by which firm mechanical and electrical connections are made between the power line conductors 15 and the spring clip members, the conductors entering the housing 21 through the above-mentioned openings 21h and 21k (Figure 2).

The upper spring clip member 42 is seated within, and secured in any suitable manner, such as by riveting, to, an additional spring clip member 44 (see Figures 2 and 3) which is also preferably U-shaped, having its end portions bend reentrantly as at 44a and 44b (Figure 3).

The upper fuse supporting bracket 27 is notched or recessed on opposite sides, as at 27c and 27d (Figure 3) and pointed as at 27e so as to enter easily in between and force apart the ends of spring clip member 44 when the cover 23—26 is closed, the reentrant parts 44a—44b then snapping into the recesses 27c and 27d, thus holding the cover reliably closed.

The clip members are of metal and hence conductive so that a good electrical path is provided from the one or upper line conductor 15 (Figure 2), binding post 42b—43, spring clip 42, ring contact 40 on the fuse, spring contact 38, fuse supporting bracket 27 (also by way of spring clip 44 and fuse supporting bracket 27), end cap 36, fuse link 33 interiorly connected to cap 36 and extending axially and downwardly of the fuse tube 32 and then out of the lower open end of tube whence it is bent upwardly into connection with parts 34—35 (also by lower fuse bracket 28 and spring 37 to ring contact 35), spring clip 41, binding post 41b—43, and thus to the other or lower line conductor 15.

Thus the fuse member 29 through its link 33 is directly inserted into the power line 15 when the housing 21 is closed by the cover 23; a firm and secure electrical and mechanical engagement being assured by the notch and tip construction of support 27 and spring clip 44.

Intermediate of blocks 30 and 31 on the righthand face of panel 26 (Figure 2) is a block 48 of metal secured in place by screws, as shown.

The fuse 29 is shunted by a signal circuit which, illustratively, includes a suitable gaseous conduction tube 46, such as a neon tube, and a suitable impedance 47, such as a resistor element, in series therewith (Figure 2). The gaseous conduction device 46 is preferably in the form of a shallow U-shaped glass tube having its end portions received within suitable recesses 31a and 48a provided in the conductive supporting members 31 and 48, respectively; the ends are cemented therein to give a firm mechanical connection and support. Also, the terminals of the conduction device 46 are thus brought into good electrical connection with blocks 31 and 48.

The mid-portion of the gaseous conduction device 46 is exposed outwardly through a vertically extending slot 23p (Figures 2 and 1) provided in the cover 23, this portion being preferably covered over by means of a clear glass window 49, the sides and ends of which are suitably anchored or otherwise sealed and fastened over the slotted portion 23p of the cover, as by cementing thereto as at 23q, to give a dirt-tight and thoroughly weather-proof joint.

The U-shaped tube 46 is of sufficient depth so that its mid-portion extends outwardly (to the right in Figure 2) beyond the outermost face of the lid 23 so that upon the device 46 becoming luminous in a manner to be more fully described hereinafter, good light emission throughout a wide solid angle is achieved, a feature of importance when Figure 7 is considered.

The gaseous conduction device 46 is provided with suitable electrodes 46b and 46c at the ends of the glass tube 46a, connected respectively to contact blocks 48 and 31. The resistor element 47 is also housed in the chamber of the cover 23—26, its contact tips or caps (see Figure 2) being received in suitable recesses in the adjacent faces or ends of the contact blocks 48 and 30, block 48 being common to both the gaseous device 46 and to resistor or impedance element 47, whereby they thus are connected in series. They are preferably first thus mounted on the panel or "board" 26, the latter being then assembled to the hollow cover 23.

Moreover, when cover 23—26 is closed over the housing 21 (full-line position of Figure 2), the serially-related tube 46 and impedance 47 are shunted about the clips 42—41 (through contact springs 38—37), the live current, however, flowing through the fusible fuse links 33 in the circuit above traced. Under these conditions, with a normal flow of current through the transmission line including conductors 15, and through the fuse 29, the potential difference across the two ends of the fuse, or across the clips 42—41, is practically zero or negligible, due to the low electrical resistance of the fuse link 33, the latter thus short-circuiting the serially-related resistor element 47 and gaseous conduction tube 46 so that the latter remains dark.

Upon current in the power line or through conductors 15—15 reaching an excessive value, due, for example, to a breakdown in one of the capacitor elements in the three phase capacitor unit 10 of Figure 7, the circuit-interrupting device or expulsion fuse 29 immediately blows out the fusible link 33 through the lower open end of the fiber tube 32 to completely interrupt the circuit and open the short-circuit about the tube 46. Then the potential across conductors 15—15 or across the clips 42—41 is directly impressed, by way of conducting clip 42, fuse contact 40, spring contact 38, screw 39, conductive block 30, resistor 47, block 48, gas tube 46, block 31, screw 39, spring contact 37, fuse ring-contact 35 to clip 41, across the series circuit of the gaseous conduction device or neon tube 46 and its associated impedance or resistor element 47.

The gaseous conduction device 46 is of such length and is filled with a gas, for example, neon, at such a reduced pressure that it is immediately rendered conductive upon the application of the potential of the power circuit across its terminals. Current begins to flow through the circuit of the impedance element 47 and gaseous conduction device 46, but the flow of current is limited by the impedance characteristics of the impedance device 47 so that the total line or applied potential is proportioned between impedance element 47 and the gaseous conduction device 46, the relative impedance characteristics of the two units being such as to reduce the potential across the gaseous conduction device 46 to within its normal range of operating values.

Attendant upon the establishment of a conductive path through the gaseous conduction device 46, there is a luminous glow (red orange for neon) within the tube 46; this glow then emanates from the device 46 and, due to the position or projection of the device 46 through the cover 23, this glow is shed or visible at a wide angle and thus is readily visible from the ground 20 in the illustrative mounting of Figure 7. This luminous glow, distinctive as to its color, persists until it is seen by an attendant, the light being of sufficient intensity and of such a color as to readily catch the eye either in daylight or in darkness. Thus, visual indication is given of a fault in the electrical apparatus 10 upon actuation or blowout of the circuit-interrupting device and more particularly the identical faulty device or circuit (where there are more than one, as the three devices 17, 18, 19 of Figure 7) is at once identified.

If there are more than one installation like that shown in Figure 7, the visual indication thus provided identifies which of such installations requires attention. If the apparatus 10 itself is at fault, the latter is safely and quickly disconnected from the high tension line in that the operator, using a long pole with a hook on the end, swings all of the covers 23—26 of the devices 17, 18, 19 (Figure 7) into the dotted line position A shown in Figure 2, engaging the hook in the eye 23ʳ; this operation removes the fuse member 29 from engagement with the high tension circuit or circuits 13, 14, 15, and interrupts such of these circuits as have not been interrupted by the blowing of the fuse itself. The apparatus 10 may thus safely be repaired or replaced.

In most instances, however, the only faulty part or apparatus involved is the fuse itself, which, functioning as a protective means to the apparatus 10, gave way in order to safeguard the latter; in that case, only that one or more of the various devices 17, 18 and 19, which had been indicated by the visual indication to require attention, are actuated by the hook, whereupon, as shown in the dotted lines of Figure 2, the blown fuse 29, totally disconnected (with its related supports and contact devices) from the high tension or live conductive parts, such as the conductors 15, binding posts, spring clips 42—41 and the like, may be safely removed, replaced, or repaired.

In either case, closure of the housing 19 again closes the circuit, due to the circuit-closing or bridging action of the fuse 29 itself across the clips 42—41 (Figure 2) and at this point the attendant is at once advised whether or not the repaired or replaced fuse if functioning as it should in that, if the fuse is functioning properly, luminosity of the gaseous conduction device 46 does not take place, its circuit being effectively short-circuited by the fuse itself; on the other hand, however, upon closing the housing 21, luminosity occurs, the attendant is at once advised that something is still wrong and that further repair, replacement, or attention is necessary.

Turning now to Figures 5 and 6, I have there shown a possible modified form of certain features of my invention which, excepting for the features pointed out below, is otherwise substantially the same as was above described in connection with Figures 1 to 4 inclusive.

There is again provided the panel 26 closing the hollow cover 23 and in the chamber thus formed are again mounted the supporting blocks 130, 148 and 131 (Figure 6) generally or broadly like the blocks above described in connection with Figures 1 and 2 and indicated in the latter figures respectively at 30, 48 and 31, but they are somewhat differently shaped, the intermediate block 148 being of greater horizontal dimension (as viewed in Figure 6) than the lowermost block 131 in order that the gaseous conduction device, instead of being held in a substantially vertical plane, is tilted forwardly and downwardly, thus to increase or better the visibility of its luminosity from the ground where it is, as is usually the case, mounted at a substantial height, as upon a pole.

The supporting blocks 130, 148 and 131 (Figure 6) are preferably made of solid dielectric material though they may, of course, be made of metal as was illustratively the case in Figure 2.

The gaseous conduction devices of Figures 5 and 6 comprise a glass tube 66 whose end portions contain electrodes 66ᵃ and 66ᵇ and whose intermediate portion 66ᶜ is given the shape of a helix. When so shaped, many advantages are achieved, among which may be noted the fact that the gaseous conduction path (actual length of the tubing of the envelope 66) may be made longer, a feature sometimes of great advantage where the apparatus is intended to operate at high voltages, while the winding of the tube 66 in the form of a helix materially increases the lateral dimension (see Figure 5), thus greatly enlarging the effective mass or area of luminosity when the device becomes luminous.

The gaseous conduction tube 66 is mounted and sealed within a clear glass tube 67 whose surface, throughout about 180° to the left of its axis, as viewed in Figure 6, is silvered or otherwise provided with a reflector 68 (Figure 6) while the right-hand half of its surface, as viewed in Figure 6, is left clear; the mirror or reflecting surface 68 (Figure 5) is thus in back of the tube 66 and in reflecting the light from the latter, again enlarges the apparent or effective area of luminosity, virtually making the latter commensurate with the size of the opening 69 (Figures 5 and 6) in the cover 23 through which the two glass tubes are exposed.

The glass tube 67 (Figure 6) is provided with metal end caps 67ᵃ and 67ᵇ with which the electrodes 66ᵃ and 66ᵇ, respectively, are in electrical interconnection, and through which the device is included in its circuit in a manner clear from what has been said in connection with Figure 2. If the supports 131 and 148 of Figure 6 are metallic, the metal end caps above-mentioned are in direct connection therewith while if they are made of insulating material, conductor 70 connects the end cap 67ᵇ and hence the electrode 66ᵇ to the screw 39 which is in turn in connection with the contact spring 37, while the upper end cap 67ᵃ has connected to it a conductor 71, both conductors being soldered where and as necessary.

The impedance device 147 of Figure 6 is secured in place upon the blocks 130 and 148 as by screws, as shown in Figure 6, and it may take the form of a condenser, such as a so-called mica condenser, to one terminal of which the connecting conductor 71 is secured and to the other terminal of which a conductor 72 leads to the upper screw 39 which in turn is in connection with the contact spring 38. Thus, the impedance 147 and the gaseous conduction tube 66 are serially connected and this series arrangement bridged across or shunted about the conductive portion of the fuse 29.

The cover 23 of Figures 5 and 6 is suitably molded or shaped, as shown in these figures, to accommodate the above-described parts and to provide a downwardly and forwardly inclined opening or window 69 through which the parts 66—67 are exposed. Any suitable sealing compound is employed to seal the tube 67 in the window or opening 69 of the cover 23 to provide a weather-tight connection therebetween.

A feature embodied in Figures 5 and 6 and lending greater simplicity of manufacture resides in arranging the hinge pin 22 carried by the housing 21 so that it coacts with a downward extension 26ˣ (lower portion of Figure 6), whence the side and top and bottom walls of the hollow cover 23 are simpler to mold or fabricate and need merely rest flush against or be interfitted with the right-hand face (rabbeted or not as may be desired) of the panel 26.

As for both illustrative forms shown, the chamber formed within the lid 23 is made weatherproof in any suitable way, as by using sealing compounds as mentioned above to seal various joints, such as also, for example, to seal the heads of the bolts 45 which secure the panel or baffle board 26 and the hollow lid 23 together.

The operation and functioning of the form of Figures 5 and 6 will be clear in view of what has already been set forth above.

I have above indicated certain materials preferably employed in making up the housing 19 and the lid or cover 23—26; I preferably employ a suitable moldable material having appropriate non-conducting properties and preferably the material is also non-combustible. Conveniently ceramic material such as porcelain is used.

The impedance device or devices used in circuit with the gaseous conduction tube serves as an appropriate protection for the gaseous conduction tube itself; these tubes are sometimes constructed and operated so that inherently the current increases through the tube even though the potential across the tube itself remains constant or decreases somewhat; where the tube has these latter-mentioned characteristics, the impedance serves virtually as a ballast in the circuit of the tube and limits the current flow through the latter to a safe value. Thus, long life of the tube is insured and a dependable and long-continued indicating action thereof also insured, a feature of particular value where the device is installed in connection with a transmission line at a relative inaccessible or remote territorial point in which case it might require some time before an attendant reaches the particular pole or transmission tower to see whether or not an indicating device thereon is indicating trouble.

It will thus be seen that there has been provided in this invention an apparatus in which the various objects hereinabove noted together with many practical advantages are successfully achieved, and that the apparatus is well adapted to meet the varying conditions of hard practical use.

As many possible embodiments may be made of the above invention and as many changes might be made in the embodiment above set forth, it is to be understood that all matter hereinabove set forth or shown in the accompanying drawings, is to be interpreted as illustrative and not in a limiting sense.

I claim:

1. In apparatus of the character described, in combination, an open box-like container carrying therein contact members, closure means for said container, said means being shaped to have therein a chamber, circuit-controlling means positioned and enclosed within said container when said closure means is in closing position but being mounted on that side of said closure means facing inwardly of said container, said controlling means having contact means for engaging said contact means within the container when said closure means is moved into closing position and for disengaging therefrom when said closure means is moved into container-opening position, said closure means having a window communicating with said chamber, a gaseous conduction tube mounted within said chamber and exposed through said window, an impedance device mounted within said chamber and serially connected with said tube, and contact means forming the terminals of said serially arranged impedance and tube, said contact means being exposed on that face of said closure means that faces the inside of said container and being in electrical connection with said circuit-controlling means.

2. In apparatus of the character described, in combination, an open-ended box-like container having spaced contact members therein, a closure for said container, means on that face of said closure facing the inside of said container for detachably supporting a circuit-controlling device, said device having spaced contact members adapted to engage respectively said first-mentioned contact members when said closure is in closing position, spaced contact members carried by said closure member and being positioned so that they are engaged by the contact members of said device when the latter is mounted in place, an indicating device mounted on that face of said closure that faces away from said container, whereby said closure member separates said indicating device from said circuit-controlling device, and means for electrically connecting the terminals of said indicating device to said third-mentioned contact members.

3. In apparatus of the character described, in combination, an open-ended box-like container having spaced contact members therein, a closure for said container, means on that face of said closure facing the inside of said container for detachably supporting a circuit-controlling device, said device having spaced contact members adapted to engage respectively said first-mentioned contact members when said closure is in closing position, spaced contact members carried by said closure member and being positioned so that they are engaged by the contact members of said device when the latter is mounted in place, a gaseous conduction device mounted on the outer face of said closure member, whereby said closure member separates said gaseous conduction device from said circuit-controlling device, means electrically connecting the terminals of said conduction device to said third-mentioned contact members, said last-mentioned means including an impedance device.

4. In apparatus of the character described, in combination, an open-ended box-like container having spaced contact members therein, a closure for said container, means on that face of said closure facing the inside of said container for detachably supporting a circuit-controlling device, said device having spaced contact members adapted to engage respectively said first-mentioned contact members when said closure is in closing position, spaced contact members carried by said closure member and being positioned so that they are engaged by the contact members of said device when the latter is mounted in place, a gaseous conduction tube bent back upon itself, means mounting said tube on the outer face of said closure, whereby said closure extends between said circuit-controlling device and said tube and means connecting the terminals of said tube to said third-mentioned contact members.

5. In apparatus of the character described, in combination, an open-ended box-like container having spaced contact members therein, a closure for said container, means on that face of said enclosure facing the inside of said container for detachably supporting a circuit-controlling device, said device having spaced contact members adapted to engage respectively said first-mentioned contact members when said closure is in closing position, spaced contact members carried by said closure member and being positioned so that they are engaged by the contact members of said device when the latter is mounted in place, a visual signaling device positioned on the outer side of said closure, whereby said closure forms a barrier between said two devices, means electrically connecting said signaling device to said third-mentioned contact members, and means having a window therein for forming an enclosure for said signaling device, the latter being exposed through said window.

6. In apparatus of the character described, in combination, an open-ended box-like enclosure supporting a pair of spaced spring contact clips, a two-part closure for the open end of said enclosure hingedly connected to the latter, said parts being shaped to form by themselves an enclosed chamber and the outermost of said parts having a window therein, a temperature-responsive circuit-controlling device having a pair of spaced contacts, means detachably supporting said circuit-controlling device upon the inner face of the innermost of said two parts and adapted to be respectively engaged and held by or disengaged from said spaced spring clips as said two-part closure is swung into or out of closing position relative to said enclosure, a pair of spaced spring contacts carried by said closure and positioned to be contacted by said contacts on the circuit-controlling device when the latter is supported by said closure part, an electro-responsive signaling means within said chamber, and means electrically connecting said electro-responsive signaling means to said third-mentioned spring contacts.

7. In apparatus of the character described, in combination, an open-ended box-like enclosure supporting a pair of spaced spring contact clips, a two-part closure for the open end of said enclosure hingedly connected to the latter, said parts being shaped to form by themselves an enclosed chamber and the outermost of said parts having a window therein, a temperature-responsive circuit-controlling device having a pair of spaced contacts, means detachably supporting said circuit-controlling device upon the inner face of the innermost of said two parts and adapted to be respectively engaged and held by or disengaged from said spaced spring clips as said two-part closure is swung into or out of closing position relative to said enclosure, a pair of spaced spring contacts carried by said closure and positioned to be contacted by said contacts on the circuit-controlling device when the latter is supported by said closure part, electro-responsive signaling means, means within the chamber formed by said two-part closure for detachably supporting said signaling means, whereby said signaling means is supported within said chamber and whereby, upon separation of the two parts of said two-part closure, access to said signaling means may be gained, and means electrically connecting said signaling device to said third-mentioned spring contacts.

8. In apparatus of the character described, in combination, a box-like container having one end open, a closure for said container, said closure being in the form substantially of totally enclosed box-like means, a fusible circuit-controlling means within said container and made accessible upon moving said box-like means away from said container, and electro-responsive signaling means within said box-like means and electrically related to said fusible means for indicating the condition of the latter.

9. In apparatus of the character described, in combination, a box-like container having one end open, a closure for said container, said closure being in the form substantially of totally enclosed box-like means, a fusible circuit-controlling means within said container and made accessible upon moving said box-like means away from said container, said box-like means having a glass window in an exposed wall thereof, an electro-responsive source of light within said box-like means and positioned to illuminate said window, and means electrically relating said source of light to said fusible means for indicating the condition thereof.

10. In apparatus of the character described, in combination, a support having a fixed contact, a hollow member movably related to said support, a circuit-interrupting device carried exteriorly of and by said hollow member and adapted thereby to be brought into or out of electrical relation to said contact, an electro-responsive luminous visual signaling device within said hollow member, the latter having an aperture through which said signaling device is visible, and means within said hollow member for electrically relating said signaling device to said interrupting device and for controlling the energization of said signaling device.

11. In apparatus of the character described, in combination, a support having a fixed contact, a hollow member movably related to said support, a circuit-interrupting device carried exteriorly of and by said hollow member and adapted thereby to be brought into or out of electrical relation to said contact, said hollow member having an aperture therein, a translucent member closing said aperture, an electro-responsive luminous means mounted within said hollow member and positioned adjacent said translucent member, and means electrically relating said luminous means to said circuit-interrupting device.

12. In apparatus of the character described, in combination, a support having a fixed contact, a hollow member movably related to said support, a circuit-interrupting device carried exteriorly of and by said hollow member and adapted thereby to be brought into or out of electrical relation to said contact, said hollow member having a wall inclined to the vertical and said inclined wall having a translucent window member therein, an electro-responsive luminous means extending along said window but within said hollow member, and means electrically relating said luminous means to said circuit-interrupting device.

13. In apparatus of the character described, in combination, a support having a fixed contact, a second support hinged to said first support, a conductive member, means mounting said member upon the inside face of said hinged support and adapted thereby to be moved into or out of coaction with said contact, a light-reflecting means mounted on the other side of said hinged support and positioned to reflect light away therefrom, an electro-responsive illuminating device operatively related to said reflecting means, and means electrically relating said electro-responsive means to said fixed contact and to said conductive member.

14. In apparatus of the character described, a support having a fixed contact, a second support hinged to said first support, a conductive member, means mounting said member upon the inside face of said hinged support and adapted thereby to be moved into or out of coaction with said contact, a light-reflecting means mounted on the other side of said hinged support and positioned to reflect light away therefrom, a gaseous conduction tube positioned adjacent the outer face of said light-reflecting means, and means forming electrical connections between said conductive member and said conductive tube.

15. In apparatus of the character described, a support having a fixed contact, a second support hinged to said first support, a conductive member, means mounting said member upon the inside face of said hinged support and adapted thereby to be moved into or out of coaction with said contact, a light-reflecting means mounted on the other side of said hinged support and positioned to reflect light away therefrom, a gaseous conduction tube of relatively small diameter bent back and forth upon itself and positioned in front of said reflecting means, and means electrically relating said gaseous conduction tube to said conductive member and said contact.

16. In apparatus of the character described, in combination, a support having a fixed contact, a second support hinged to said first support, a conductive member, means mounting said member upon the inside face of said hinged support and adapted thereby to be moved into or out of coaction with said contact, a glass tube of relatively large diameter supported at the outside face of said hinged support, a gaseous conduction tube within said glass tube, means securing said first glass tube to said hinged support and encasing it excepting for an outer longitudinal and peripheral portion of said first tube, and means forming electrical connections of said conduction tube to said conductive member and said contact.

17. In apparatus of the character described, in combination, an open-ended box-like enclosure supporting a pair of spaced spring contact clips, a two-part closure for the open end of said enclosure hingedly connected to the latter, said parts being shaped to form by themselves an enclosed chamber and the outermost of said parts having a window therein, a temperature-responsive circuit-controlling device having a pair of spaced contacts, means detachably supporting said circuit-controlling device upon the inner face of the innermost of said two parts and adapted to be respectively engaged and held by or disengaged from said spaced spring clips as said two-part closure is swung into or out of closing position relative to said enclosure, a pair of spaced spring contacts carried by said closure and positioned to be contacted by said contacts on the circuit-controlling device when the latter is supported by said closure part, a gaseous conduction device in said chamber but adjacent said window and adapted to become luminous upon the application thereto of a certain potential, and means including a current-limiting device within said chamber for connecting said gaseous conduction tube to said third-mentioned contacts.

18. In apparatus of the character described, in combination, an open-ended box-like enclosure supporting a pair of spaced spring contact clips, a two-part closure for the open end of said enclosure hingedly connected to the latter, said parts being shaped to form by themselves an enclosed chamber and the outermost of said parts having a window therein, a temperature-responsive circuit-controlling device having a pair of spaced contacts, means detachably supporting said circuit-controlling device upon the inner face of the innermost of said two parts and adapted to be respectively engaged and held by or disengaged from said spaced spring clips as said two-part closure is swung into or out of closing position relative to said enclosure, a pair of spaced spring contacts carried by said closure and positioned to be contacted by said contacts on the circuit-controlling device when the latter is supported by said closure part, an electro-responsive visual signaling means within said chamber but positioned to be exposed to view through said window, and means including a protective device for said signaling means for connecting the latter to said third-mentioned spring contacts.

19. In apparatus of the character described, in combination, an open-ended box-like enclosure supporting a pair of spaced spring contact clips, a two-part closure for the open end of said enclosure hingedly connected to the latter, said parts being shaped to form by themselves an enclosed chamber and the outermost of said parts having a window therein, a temperature-responsive circuit-controlling device having a pair of spaced contacts, means detachably supporting said circuit-controlling device upon the inner face of the innermost of said two parts and adapted to be respectively engaged and held by or disengaged from said spaced spring clips as said two-part closure is swung into or out of closing position relative to said enclosure, a pair of spaced spring contacts carried by said closure and positioned to be contacted by said contacts on the circuit-controlling device when the latter is supported by said closure part, a glass tube closing said window, a gaseous conduction tube in said glass tube, and means electrically connecting the terminals of said conduction tube to said third-mentioned spring contacts.

20. In apparatus of the character described, in combination, an open-ended box-like enclosure supporting a pair of spaced spring contact clips, a two-part closure for the open end of said enclosure hingedly connected to the latter, said parts being shaped to form by themselves an enclosed chamber and the outermost of said parts having a window therein, a temperature-responsive circuit-controlling device having a pair of spaced contacts, means detachably supporting said circuit-controlling device upon the inner face of the innermost of said two parts and adapted to be respectively engaged and held by or disengaged from said spaced spring clips as said two-part closure is swung into or out of closing position relative to said enclosure, a pair of spaced spring contacts carried by said closure and positioned to be contacted by said contacts on the circuit-controlling device when the latter is supported by said closure part, a glass tube closing said window, a gaseous conduction tube in said glass tube, said first-mentioned glass tube having the surface of such portions thereof as do not directly close said window covered with a light-reflecting means for reflecting light from said gaseous conduction tube out through said window, and means electrically relating said conduction tube to said third-mentioned spring contacts.

21. In apparatus of the character described, in combination, an open-ended box-like enclosure supporting a pair of spaced spring contact clips, a two-part closure for the open end of said enclosure hingedly connected to the latter, said parts being shaped to form by themselves an enclosed chamber and the outermost of said parts having a window therein, a temperature-responsive circuit-controlling device having a pair of spaced contacts, means detachably supporting said circuit-controlling device upon the inner face of the innermost of said two parts and adapted to be respectively engaged and held by or disengaged from said spaced spring clips as said two-part closure is swung into or out of closing position relative to said enclosure, a pair of spaced spring contacts carried by said closure and positioned to be contacted by said contacts on the circuit-controlling device when the latter is supported by said closure part, a gaseous conduction device in said chamber but adjacent said window and adapted to become luminous upon the application thereto of a certain potential, a translucent member closing said window and mechanically protecting said conduction tube, and means electrically connecting the terminals of said conduction tube to said third-mentioned spring contacts.

BROR G. OLVING.